A. M. CARLSEN.
APPARATUS FOR BAKING PASTRY CONES.
APPLICATION FILED FEB. 19, 1910.
1,078,572.
Patented Nov. 11, 1913.
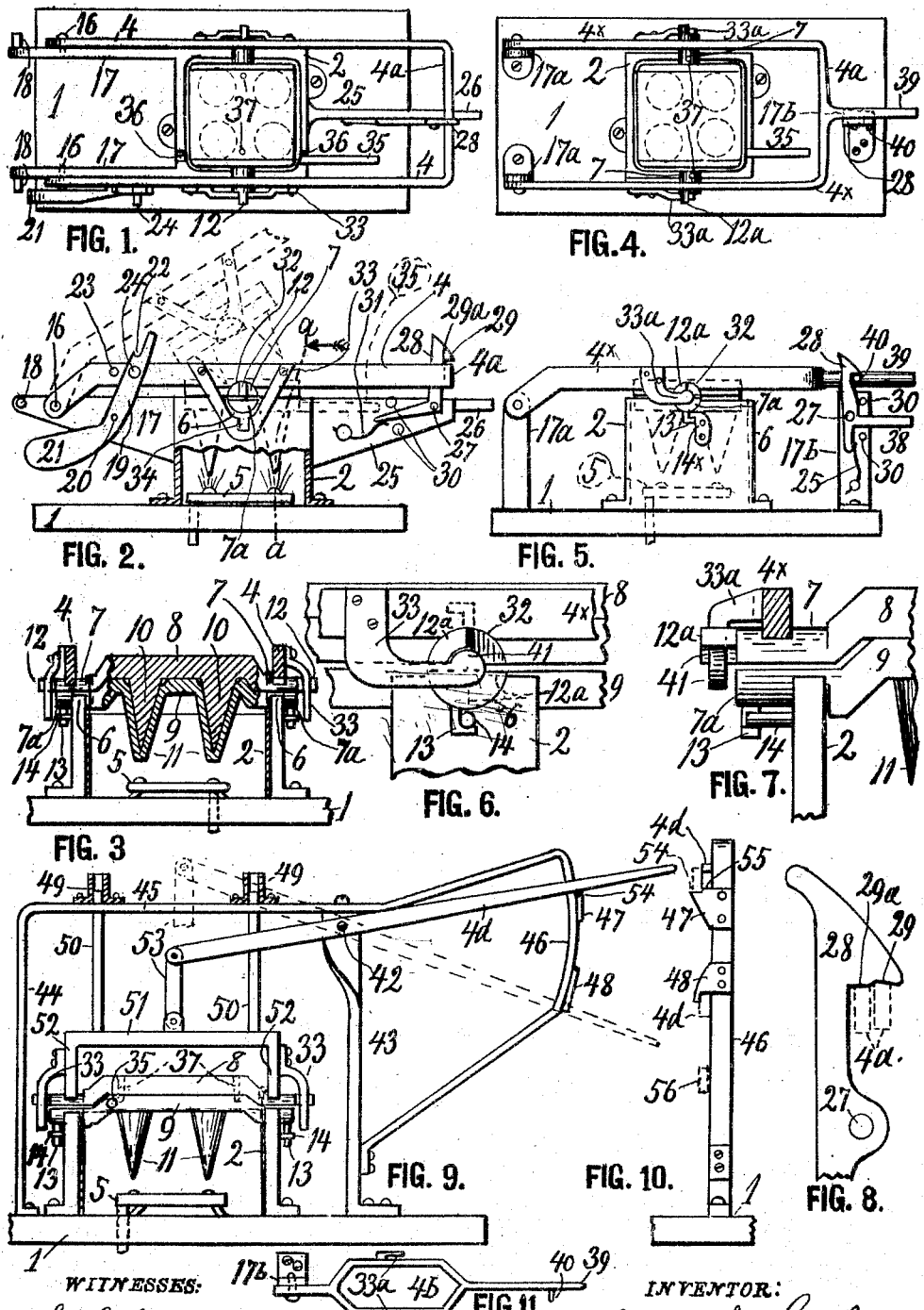

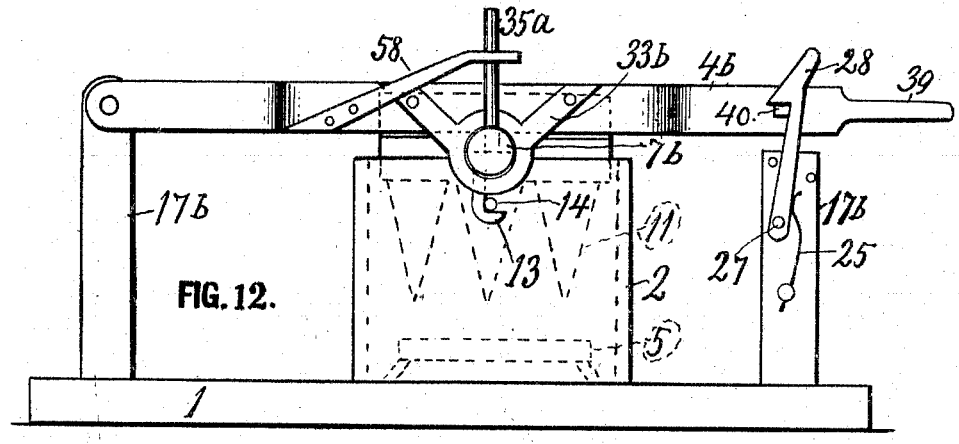
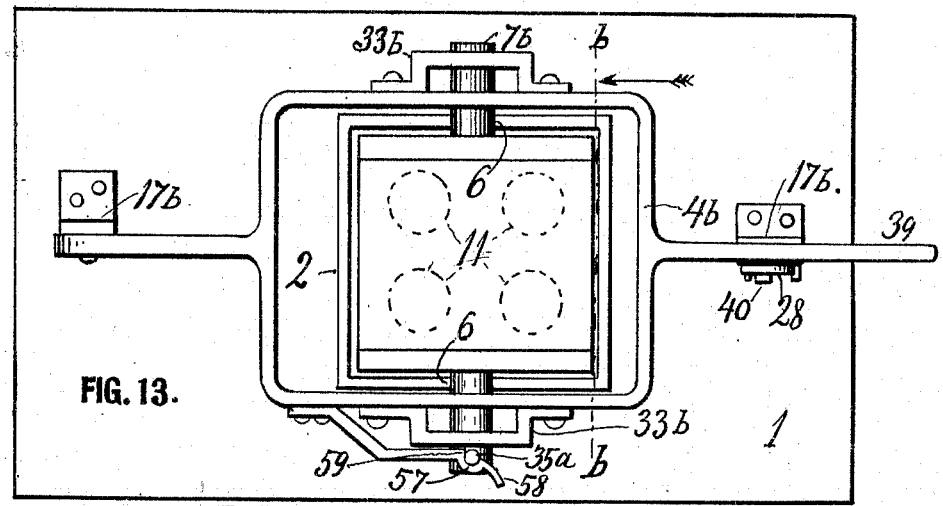
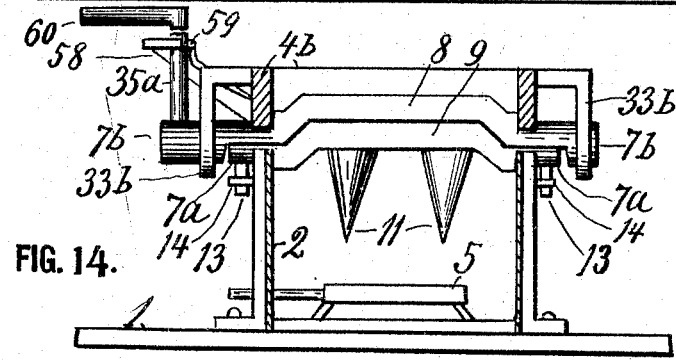

UNITED STATES PATENT OFFICE.

ANDREW M. CARLSEN, OF ST. PAUL, MINNESOTA, ASSIGNOR, BY MESNE ASSIGNMENTS, TO STANDARD CONE COMPANY, OF ST. PAUL, MINNESOTA, A CORPORATION OF MINNESOTA.

APPARATUS FOR BAKING PASTRY CONES.

1,078,572. Specification of Letters Patent. Patented Nov. 11, 1913.

Application filed February 19, 1910. Serial No. 544,863.

*To all whom it may concern:*

Be it known that I, ANDREW M. CARLSEN, a citizen of the United States, residing at St. Paul, in the county of Ramsey and State of Minnesota, have invented a new and useful Apparatus for Baking Pastry Cones, of which the following is a specification.

My invention relates to devices for molding and baking hollow pastry cones and cups; and the object is to provide a novel and improved device for said purpose.

The device consists mainly of a supporting frame, a mold plate and a core plate rotatably supported thereon and a lever fulcrumed to the support and so connected with one of the plates that it may lift it from the other plate but will not interfere with the rotation of the plates.

In the accompanying drawing Figure 1 is a top or plan view of one form of my device. Fig. 2 is a partly sectional side elevation of the device shown in Fig. 1. Fig. 3 is a section on line *a—a* in Fig. 2. Fig. 4 is a modification of the device shown in Fig. 1. Fig. 5 is a side elevation of the device shown in Fig. 4. Fig. 6 is an enlarged fragment from the upper middle portion of Fig. 5. Fig. 7 is a right hand side view of Fig. 6. Fig. 8 is a detail view of the upper portion of the dog or hook that holds the working lever in pressing position upon the plates. Fig. 9 is a partly sectional side elevation of the device with the plate lifting means modified. Fig. 10 is a right hand side or edge view of the right hand portion of the structure shown in Fig. 9. Fig. 11 is a further modification of the lever and its support in Fig. 4. Fig. 12 is a side view and Fig. 13 is a top view of a modification of the apparatus. Fig. 14 is a section on line *b—b* of Fig. 13 with slight modifications.

Referring to the drawing by reference numerals, the support or supporting frame already above mentioned comprises a base 1, a stove casing 2, brackets 17 or modified into posts 17ª, on which the lever 4 is fulcrumed. The base may be a stationary table or bench, or a portable plank adapted to be secured upon any structure that will hold it at convenient elevation for operation. The stove casing 2 an inclosure about the baking fire which is preferably maintained by a gas burner 5 in the lower part of the stove casing. The upper edge of the stove casing is provided with two opposite open bearings 6, in which rest the journals of a plate 8, carrying any desired number of conic cores 10, and of a plate 9 carrying a corresponding number of molds 11 to receive said cores, leaving a small space between each mold and its core for the dough or pastry to be formed and baked in. Said journals are arranged at opposite edges of the plates and are longitudinally divided into semi-cylindrical half-journals, 7 on the core plate and 7ª on the mold plate.

Each half journal on the core plate has its end formed with a projection 12, which in Figs. 1, 2 and 9 is shown to be angular and preferably slightly flat in cross section and projecting beyond the end of journal 7ª; and the latter half journal has its normally lower side provided with a hook 13 adapted to engage a pin 14 fixed in the side of the stove casing (as best shown in Fig. 6), this is to prevent raising of the mold plate when the core plate is raised as the baked pastry may cause the plates to stick together.

The core plate is raised and lowered by the lever 4, which in Figs. 1 and 2 is shown as a double or U-shaped lever fulcrumed at 16 to brackets 17, which project from the rear side of the stove casing and may have lugs 18 for the lever to lean rearward against when the device is fully opened. In a less open position the lever may be supported by a prop 19, which is pivoted at 20 and provided with a weight 21, that tends at all times to swing the prop with its notch 22 into supporting engagement with a pin 23 fixed on the lever. This prop holds the lever with the core plate in an inclined position a little higher than indicated in dotted lines in Fig. 2, which is a handy position for removing the pastry cones from the cores, where they usually stick some. When the lever is to be lowered again the operator grasps with one hand the handle bar 4ª of the lever and with the other hand he takes hold of the pin 24 of the prop and swings it slightly forward so he can lower the lever. At the front side of the stove casing is a single bracket 25, whose end may form a handle 26. To said bracket is pivoted at 27 a hook 28, which plays between two pegs 30 and is normally held by a spring 31 in position to engage by its shoulders 29 or 29ª the upper edge of the handle bar 4ª of the lever, (see Fig. 8) the shoulder 29 provides for a gentle pressure on the plates for a few seconds until the water in the dough has turned into steam and escaped; the shoulder 29ª is then applied to produce a greater pressure during the rest of the baking process, the plates being turned over with core plate downward before the greater pressure is applied. The baking usually takes only from one to two minutes, after which the core plate is again turned to the top, the hook 28 disengaged, the lever and core plate raised, the baked cones or cups removed and after new dough has been placed in the molds the core plate is again brought down, the lever locked by the hook and the process repeated.

Each side bar of the lever has a shallow notch 32 at the point where it presses upon the journal, and adjacent thereto it has a hanger 33 (best shown in Fig. 2) extending downward beyond the end of journal $7^a$ and provided with a deep notch 34, which during the raising of the lever engages the bottom and sides of the projection 12 and then raises the core plate away from the mold plate and brings the former to an inclined position. When the core plate is again lowered the hanger moves with its notch 34 low enough to permit the journals to rotate. The rotation or turning up side down of the plates may be done by any suitable handle fixed to one of the plates or their journals, in Figs. 1, 2 and 9 I have shown an arm 35 serving that purpose, it is fixed on the mold plate and adapted to rest upon the edge of the stove casing at either side of it, or if the stove casing is too high for that it may have notches 36 for the arm; said arm is long enough to act as a hand lever in turning the plates even while the lever presses on them.

37 are dowel pins to help bring the plates and cores in correct position.

In the modification in Figs. 4, 5, 6 and 7 is shown a form in which the stove casing is of sheet iron or otherwise too weak to stand the working of the lever. The latter is fulcrumed to two posts $17^a$ and the front bar $4^a$ is held down by a post $17^b$ on which the hook 28 is mounted at 27 and pressed by spring 25. The dog or hook is also modified by having a handle 38 by which it may be manipulated. The handle may also act as a weight and make spring 25 superfluous. Also the lever is slightly modified by having a handle 39 with a pin 40 for the hook to engage. In the modification shown in Fig. 11 the lever $4^b$ may be fulcrumed to a single post $17^b$. In Figs. 5, 6 and 7 is best shown that the lever here under consideration is also modified by having the side hangers $33^a$ open toward the front of the machine, so that the projections $12^a$ of the journal will turn from above to below the arm $33^a$ constituting the hanger, that is, turn to the dotted line position $12^a$ in Fig. 6 and then back to the full line position when the core plate is to be raised by the hanger. It will be seen also that this arrangement enables the molding device to be rotated half a turn, and still the core plate when in proper position to be lifted, is for that purpose connected with the lever. In this case the hanger has an upward bulge 41 to prevent escape of the journal and the projection $12^a$ is segmental in cross section, forming a groove for said bulge; but it is obvious that also this opensided hanger could have a notch like 34 and the journal could have a projection 12 the same as in Fig. 2. The advantage in Fig. 6 is that the lost motion in Fig. 2 is avoided, but on the other hand the notch 34 insures a more firm position of the core plate while it is away from the mold plate. In Fig. 5 a kind of hook $14^x$ is shown instead of a pin 14 in Fig. 7. It will in some cases be preferable to the pin.

In the modification in Fig. 9 the lever is fulcrumed at 42 intermediate its ends to a post 43, which post and a post 44 and top bar 45 make a kind of guiding frame, from which extends a lever keeper 46 with catches 47, 48 for the lever to engage above and below respectively. In suitable guides 49 on the bar 45 slide two vertical rods 50, to whose lower ends is fixed a bridge bar 51, having downward bent ends 52 pressing upon the journals $7-7^a$. To said angular end 52 are secured the hangers 33, or they may be of the modified form $33^a$. In this instance the inner end of the hand lever is connected by a link 53 to the middle of the bridge bar or presser bar 51.

In the operation of the form in Figs. 9 and 10, the gentle pressure on the plates is caused by swinging lever $4^d$ upon the shoulder 54 and the greater pressure by forcing the lever upon the higher shoulder 55. When the core plate is raised considerably above the mold plate for the removal of the baked cones, the core plate does not incline, the lever is thrown underneath the catch 48, which being hook-shaped prevents accidental escape of the lever and dropping of the core plate while the pastry cones are being removed therefrom in any suitable manner, one of which is to place a shallow box below the pastry cones while bringing the lever down to the position 56 in Fig. 10 and make a light blow with it upward against the catch 48; this will ordinarily cause the pastry cones to drop into the box. The operation of the other forms has already been described. The paste or dough is put into the molds by any suitable means and method. The gas burner shown, or any other suitable means will furnish the heat for the baking. In Figs. 6 and 7 is shown at $2^x$ how the journals may rest on posts which do not form an entire stove casing, and in Figs. 3 and 9, 2 indicates thin, cheap sheet metal used as a guard about the flame while the journals rest in the firm posts adjacent thereto.

In Figs. 12, 13 and 14 the lever is of about the same form as in Fig. 11, only that the hangers 33<sup>b</sup>, which may be secured on or made integral with the lever, need not to be open above the journals they engage, and said journals 7<sup>b</sup> of the core plate 8 are cylindrical in the hangers, but farther in they are half-round so as to form cylinders when together with journals 7<sup>a</sup> and to rotate with the latter in the bearings and receive pressure from the main lever, (as best shown in Fig. 14).

The journals 7<sup>b</sup> are preferably loosely fitted in the hangers, so as not to resist the lever when it is to press upon the journals of the mold plate when the latter is turned upward. In this case the plates are rotated by a small lever 35<sup>a</sup>, which is fixed on one of the journals 7<sup>b</sup> and engages in a notch 57 in a springy arm 58 fixed on the main lever, the arm having a shoulder 59 to stop the motion of the small lever when the core plate is in its proper upward position for separation from the mold plate; when the core plate has been raised and it is lowered again into baking position and the two plates are to be turned, the lever 35<sup>a</sup> is simply turned downward, the springy arm yielding and letting it escape from the notch automatically.

In Fig. 14 is shown how the lever 35<sup>a</sup> may have a horizontal arm or handle 60, which makes it a crank that is very handy for quick turning of the plates. The advantages of the modifications shown in the last three figures are, that when the mold plate is upward the lever will readily lift both plates together and give access to the interior of the stove when so desired; also that there is practically no lost motion between the hangers and the journals of the core plate, and further, that the considerable length of the lever or crank portion 35<sup>a</sup> from the journal to the springy arm causes the core plate to be held in more accurate position for return to the mold plate than any of the other means shown could give it.

It is obvious that the forms of hangers and journals and turning means shown in the last three figures are applicable also with the bar 51 in Fig. 9, especially since it is evident that said bar may to good advantage be secured across any of the levers shown outside of the form in Fig. 9, and most readily so to lever 4<sup>b</sup>, as the ends of bar 51 may carry any form of hangers.

What I claim is:

1. In a device of the kind described, the combination of a supporting base and open journal bearings thereon, two plates one equipped with molds and the other with cores adapted to go into the molds, both plates having semi-cylindrical journal members adapted when the plates are brought together to form cylindrical split journals in the bearings, the journal members on the core-equipped plate having at their outer ends cylindrical extensions in axial line with the split journals; two eyes permanently encircling said end extensions, a lever mounted on the base and operatively connected with said eyes and having portions arranged to press upon the split journals and thereby hold the plates together during the baking process, and automatic catching means for holding the lever in said pressing position, and means for applying heat to the plates.

2. In a device of the kind described, the combination of a base, a stove casing secured thereon and having in its upper edges two opposite open journal bearings, and transversely to a line through said journal bearings arms extending from the rear side of the casing, and one arm extending from the front side of the casing, a pair of baking irons having each a pair of journal members forming when brought together split journals resting in the bearings; a lever fulcrumed to the rear arms of the casing and means on the front arm for engaging the lever and holding it in pressing contact upon the split journals, and hangers carried by the lever and permanently journaled to the ends of the journal members of one of the baking irons.

3. In a device of the kind described, the combination of a base, a stove casing mounted thereon and having in its upper edges two opposite open journal bearings, and transversely to a line through said bearings two arms extending from the rear side of the casing, and one arm upon the front side of the casing, a pair of baking irons having split journals rotatable in said bearings; a lever fulcrumed to the rear arms of the casing, an automatically engaging catch on one of the rear arms arranged to engage and hold the lever in a raised position; means on the lever for pressing upon the two split journals, and means on the lever permanently journaled to the journal members of one of the baking irons to lift it in level position from the other baking iron, the latter iron having catches and the stove casing having means for said catches to engage for the purpose set forth; and means on the front arm of the stove casing adapted to automatically engage the lever and hold it in pressing contact with the split journals.

In testimony whereof I affix my signature, in presence of two witnesses.

ANDREW M. CARLSEN.

Witnesses:
 L. C. CARLSEN,
 A. E. CARLSEN.